Nov. 21, 1933.    R. REYNOLDS    1,935,817

BELT AND METHOD OF MAKING THE SAME

Filed April 6, 1932

Reginald Reynolds
INVENTOR

ATTORNEY

Patented Nov. 21, 1933

1,935,817

UNITED STATES PATENT OFFICE 1,935,817

BELT AND METHOD OF MAKING THE SAME

Reginald Reynolds, Norwich, Conn., assignor to Fabreeka Belting Co. Inc., Boston, Mass., a corporation of Massachusetts Application April 6, 1932. Serial No. 603,498

3 Claims. (Cl. 154—4)

My invention relates particularly to belts for the transmission of power.

It has been known for a long time that a channeled or grooved belt has many advantages over a plain belt but the expense has been great and the belts objectionable for one reason or another.

I have sought to provide a channeled belt which will be durable and satisfactory from every standpoint and which can be made economically.

I accordingly form the belt of a plurality of layers or plies of light fabric such as canvas or duck and a compound usually containing rubber and vulcanized into a single unitary structure of the desired width and thickness. I then cut part way through the belt so as to mark out the location, width and depth of the desired channels. The layers of fabric and compound between pairs of adjacent cuts are then torn out leaving the channels of the exact location and size desired. I then preferably seal the surfaces of the fabric in the channels with a suitable compound such as rubber cement containing preferably metallic powder, for instance aluminum. This cement may also be applied to the entire surface of the belt as a repellant to oil, dust etc.

The belt 7 is formed of a plurality of layers 8 of thin but strong woven fabric interspersed with compound and vulcanized into a single structure. Preferably the layer 10 is of comparatively soft rubber between the outer fabric layer and the adjacent layer of fabric. The other layers of the adhesive material are of the grade sometimes termed friction material.

On the inner or bearing surface of the belt are a number of strips such as 11, 12, etc., which are integrally united with the main part of the belt but separated from each other by channels such as 13 and 14.

Figure 1:
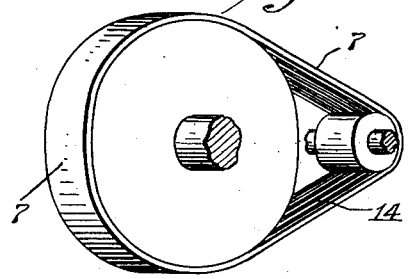
Fig. 1 is a perspective view of a channeled belt embodying my invention as applied to a condition in which the ordinary belt is of very short life and inefficient, i. e., a short center drive from a large pulley to a small one.
Figure 2:
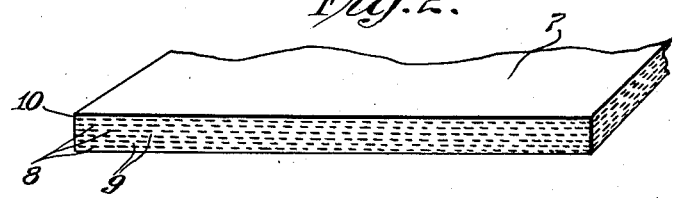
Fig. 2 is a perspective view of a fragment of a multi-ply belt formed by vulcanizing a number of layers of fabric and compound.
Figure 3:
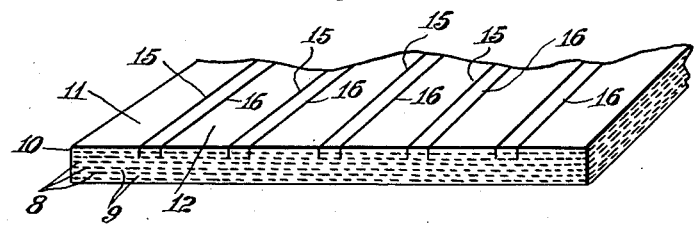
Fig. 3 is a similar view showing the cuts or incisions outlining the channels.
Figure 4:
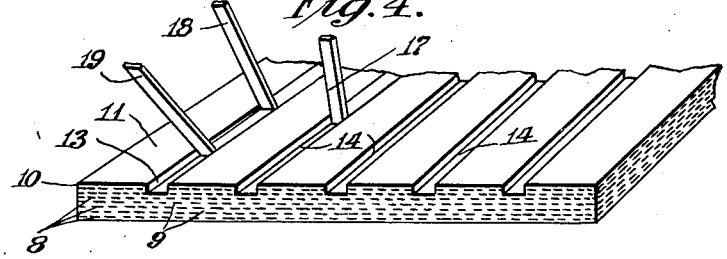
Fig. 4 is a similar view showing strips torn out to form the channels.
Figure 5:
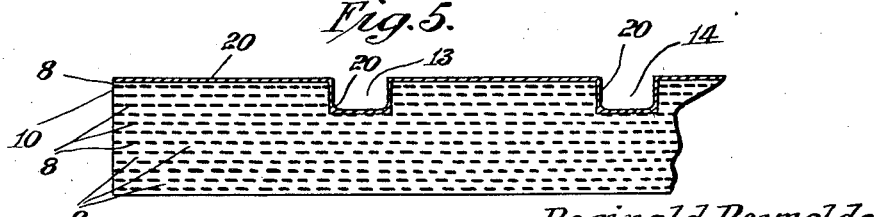
Fig. 5 is an enlarged section showing the sealing of the channels.

This belt is preferably formed by first combining a plurality of layers of the fabric and compound and vulcanizing the layers into a compact unit as shown in Fig. 2. This unit is then subjected to the action of cutting knives along the lines 15, 16, etc., parallel to the edges so as to sever the fabric and compound to the depth of the desired channels. The spacing of these cuts is regulated to correspond with the width of the desired channels. The cuts are preferably at right angles to the surface of the belt.

After these cuts or incisions have been made the material between adjacent cuts 15, 16, etc., is removed, for instance, by engaging the ends of the strips such as 17 and tearing out the strips longitudinally. In order that this may be done the fabric employed should consist of longitudinal warp threads and the usual cross filler threads. The cutting action severs the cross threads or fillers and the warp threads hold the material together so as to make it possible to tear out these longitudinal strips. All the layers may be torn out in one action as indicated at 17 or by separate actions as indicated at 18 and 19. If it is necessary to widen or deepen any of the channels additional strips may be severed and removed.

As an illustration but without intending to limit the invention a fair sized belt embodying the invention might be say 5 inches wide and 1/4 of an inch thick and comprising say 17 layers of fabric. Such a construction may have 5 channels each 5/32 of an inch wide and 2/32 to 3/32 of an inch deep formed by removing say 4 or 5 thicknesses of the fabric.

As the cutting and removal of these strips leaves raw surfaces of the fabric in the channels I prefer to seal these surfaces with a cement as shown at 20. Such a cement may be of a suitable composition consisting, for instance, of a rubber compound holding finely divided metal in suspension and dissolved in a volatile solvent. Such a compound applied in the channels seals the edges and prolongs the life of the belt. Such a composition may also with advantage be applied to the other surfaces of the belt to protect it against oil, etc., and to increase the life and wearing qualities of the belt.

By this method of manufacture it is possible to make up a belt of substantially any thickness and composed of any number of layers, say from 5 to 25. Usually in the smaller belts each channel will be about 1/8 of an inch wide and extend through 2 or more layers but in some cases they may be narrower and in other cases, especially wide and heavy belts, the channels may be wider say 1/4 of an inch wide and deeper.

In some cases it is particularly desirable to have one of the channels located in the center where the belt runs over the crown of the pulley, thus in effect providing two belt sections, one on each side of the pulley connected by the more pliable central portion.

If necessary individual channels can be easily made deeper or wider so as to provide greater flexibility and larger air passages.

This one-piece multi-ply belt is of uniform strength throughout. It is very pliable and durable and does not require the use of rivets or other fastening devices which would greatly weaken the belt. Belts which employ rivets are, of course, subject to rapid deterioration as the rivets work loose and the strips tear off. My belt being of a unitary structure is not subject to this disadvantage.

The process or method of manufacturing a channeled belt is very much cheaper than trying to form the narrow strips separately and fastening them on to a broad back.

Many installations which ordinarily require an idler in order to provide the necessary friction can be served with the new belt without an idler because of the increased efficiency of the one-piece channeled belt. My belt will, therefore, last much longer.

This channeled belt is much more pliable and efficient than a plain belt. It will carry a much greater load than a plain belt of corresponding cross sectional area. Such a belt will run more smoothly and quietly and with less wear than a plain belt.

While the channels are preferably cut in the bearing surface of the belt some advantage may be attained by the use of channels in the outer surface. In some cases, as for instance in quarter turn belts it may be desirable to provide channels in both surfaces.

I claim:

1. The process of forming a channeled belt which comprises assembling and uniting together a number of layers of fabric and compound to form a unitary belt, then forming a number of rows of parallel incisions longitudinal to the belt, and then removing the strips of fabric and compound from between adjacent incisions.

2. The process of forming a channeled belt which comprises first forming a one-piece belt with a plurality of layers of fabric and compound, then cutting through some of the layers, then tearing out the strips between adjacent cuts to form channels and then sealing the surfaces of the channels.

3. A one-piece multi-ply fabric belt composed of layers of textile fabric cemented together and having longitudinal channels in one face of the belt formed by cutting through some of the layers of fabric and then tearing out strips of fabric between adjacent cuttings.

REGINALD REYNOLDS.